(12) United States Patent  
McFadyen et al.

(10) Patent No.: US 7,724,461 B1  
(45) Date of Patent: May 25, 2010

(54) DETERMINING HEAD NON-LINEARITY IN A DISK DRIVE

(75) Inventors: James P. R. McFadyen, Redwood City, CA (US); Noureddine Kermiche, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 340 days.

(21) Appl. No.: 11/963,497

(22) Filed: Dec. 21, 2007

(51) Int. Cl.  
*G11B 21/02* (2006.01)

(52) U.S. Cl. ....................................... 360/75

(58) Field of Classification Search ................. 360/75, 360/31, 69, 137, 294.7  
See application file for complete search history.

(56) References Cited

U.S. PATENT DOCUMENTS

| | | | |
|---|---|---|---|
| 4,777,544 A | 10/1988 | Brown et al. | |
| 5,130,866 A | 7/1992 | Klaassen et al. | |
| 5,168,413 A * | 12/1992 | Coker et al. | 360/137 |
| 5,838,514 A | 11/1998 | Smith et al. | |
| 5,909,330 A | 6/1999 | Carlson et al. | |
| 6,191,901 B1 | 2/2001 | Carlson et al. | |
| 6,268,976 B1 | 7/2001 | Carlson et al. | |
| 6,288,856 B1 | 9/2001 | Ottesen et al. | |
| 6,407,874 B1 | 6/2002 | Smith et al. | |
| 6,417,981 B1 | 7/2002 | Smith | |
| 6,452,735 B1 | 9/2002 | Egan et al. | |
| 6,459,539 B1 | 10/2002 | Carlson et al. | |
| 6,519,102 B1 | 2/2003 | Smith et al. | |
| 6,608,727 B2 | 8/2003 | Ottesen et al. | |
| 6,611,389 B1 | 8/2003 | Liu et al. | |
| 6,671,110 B2 | 12/2003 | Baba et al. | |
| 6,674,590 B2 | 1/2004 | Ottesen et al. | |
| 6,678,102 B1 * | 1/2004 | Liikanen et al. | 360/31 |
| 6,717,764 B2 | 4/2004 | Lake | |
| 6,735,027 B2 | 5/2004 | Helsel et al. | |
| 6,762,899 B2 | 7/2004 | Ottesen et al. | |
| 6,765,745 B2 | 7/2004 | Smith et al. | |
| 6,771,440 B2 * | 8/2004 | Smith | 360/31 |
| 6,785,081 B2 | 8/2004 | Chapin et al. | |
| 6,865,040 B2 | 3/2005 | Fayeulle et al. | |
| 6,894,854 B1 | 5/2005 | Carlson et al. | |
| 6,930,844 B2 | 8/2005 | Yeh et al. | |
| 7,016,131 B2 | 3/2006 | Liu et al. | |
| 7,038,875 B2 | 5/2006 | Lou et al. | |
| 7,180,692 B1 | 2/2007 | Che et al. | |
| 7,212,381 B2 * | 5/2007 | Mei et al. | 360/294.7 |
| 7,292,401 B2 * | 11/2007 | Shen et al. | 360/69 |
| 7,426,090 B2 * | 9/2008 | Yamashita et al. | 360/75 |
| 7,430,083 B2 * | 9/2008 | Loh et al. | 360/31 |
| 7,457,073 B2 * | 11/2008 | Kurita et al. | 360/75 |
| 7,468,854 B2 * | 12/2008 | Yamashita et al. | 360/75 |
| 7,525,751 B2 * | 4/2009 | Han et al. | 360/75 |

\* cited by examiner

*Primary Examiner*—Fred Tzeng

(57) ABSTRACT

Disclosed is a disk drive that determines dynamic fly height (DFH) head non-linearity. A processor of the disk drive controls operations in the disk drive including: estimating a first and second set of head media spacing (HMS) actuation data for a DFH head at a first and second data frequency by commanding the application of power to the DFH head across a pre-defined power range; determining a first and second HMS value based upon the first and second sets of HMS actuation data; calculating a difference value between the first and second HMS values; determining whether the difference value exceeds a threshold.

25 Claims, 7 Drawing Sheets

DETERMINING HEAD NON-LINEARITY IN A DISK DRIVE

BACKGROUND

A huge market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable head for reading and writing data. The HSA forms part of a servo control system that positions the moveable head over a particular track on the disk to read or write information from and to that track, respectively.

Typically, a conventional hard disk drive includes one or more disks in which each disk has a plurality of concentric tracks. Each surface of each disk conventionally contains a plurality of concentric data tracks angularly divided into a plurality of data sectors. In addition, special servo information may be provided on each disk to determine the position of the head.

The head typically comprises a read/write transducer formed on the trailing surface of a slider. When the disk media is rotated, a thin film of air forms between the disk and an air bearing surface (ABS) of the slider. During operation of the disk drive, the head is said to "fly" over the surface of the disk, with the ABS being disposed just above the disk's surface. The thin film of air formed between the ABS and the disk surface is known as the air bearing. The very small separation distance between the transducer of the flying head and the surface of the disk is referred to as the "fly height". When the flying head is suspended above the disk in this manner, it is moved by the servo control system over a desired concentric track of the disk to access data stored on that track.

The fly height of the head is a factor affecting the density of magnetic data that can be stored on the disk. In recent years, the magnetic recording industry has strived to increase data storage density by employing various techniques aimed at decreasing the average fly height of the head over the rotating disk. Dynamic fly height (DFH) heads are utilized to fly at increasingly smaller fly heights to increase data storage capacity.

Typically, to control the fly height of a DFH head relative to a disk, power is applied in the form of current to a heater element of the DFH head which causes the DFH head to move closer to the disk. In this way, the DFH head is able to fly at a predetermined distance from the disk in order to read and write magnetic patterns to the disk. As storage capacity has increased, DFH heads are required to fly closer to disks and to maintain smaller more precise distances from the disks.

In order to characterize a DFH head to determine an optimal fly height, characterization testing is performed to characterize the fly height of the DFH head across an applied power range. These characterization methods typically rely on spacing models that are utilized to estimate head media spacing (HMS) in terms of an HMS curve. Typically, a Wallace spacing model is used. The Wallace spacing model or Wallace spacing loss equation, expresses a relationship between the read-back voltage from the head and head/disk spacing.

In particular, the Wallace spacing loss equation describes the amplitude of the read-back signal to the spacing of the head above the recording medium (HMS), as follows:

$$HMS = \frac{\lambda}{2\pi} * \ln\left(\frac{V_1}{V_0}\right);$$

wherein HMS is the fly height of the head above the disk; $\lambda$ is the wavelength in distance between two magnetic data transitions; $V_1$ is the amplitude of the read-back signal at distance HMS; and $V_0$ is the amplitude when the head is very close to the disk or if the head is making contact with the disk (i.e., the touchdown voltage).

A typical assumption for the Wallace spacing loss equation for the generation of HMS curves is that the measured head voltage is a linear function of the magnetic field sensed by the DFH head. Unfortunately, if the linearity assumption between the magnetic field and the read-back voltage is incorrect, the spacing measurements may lead to an erroneous determination of head/disk spacing (i.e., the fly height).

The Wallace spacing loss equation is typically utilized in the testing of DFH heads to develop an HMS actuation curve for a group of heads to determine a proper operating fly height for the DFH heads. However, the reliability of this method is premised upon the fact that the DFH heads act in a linear fashion. If a DFH head has non-linear characteristics, then the Wallace spacing loss equation may not accurately describe the DFH head and the HMS actuation curve that allegedly describes the fly height characteristics of the DFH head may likewise be inaccurate.

Unfortunately, if the fly height for non-linear DFH heads is inaccurately determined, head-disk interactions and damage to the heads and/or disks may occur during operation. It is therefore desirable to identify non-linear DFH heads.

DETAILED DESCRIPTION

Figure 1:
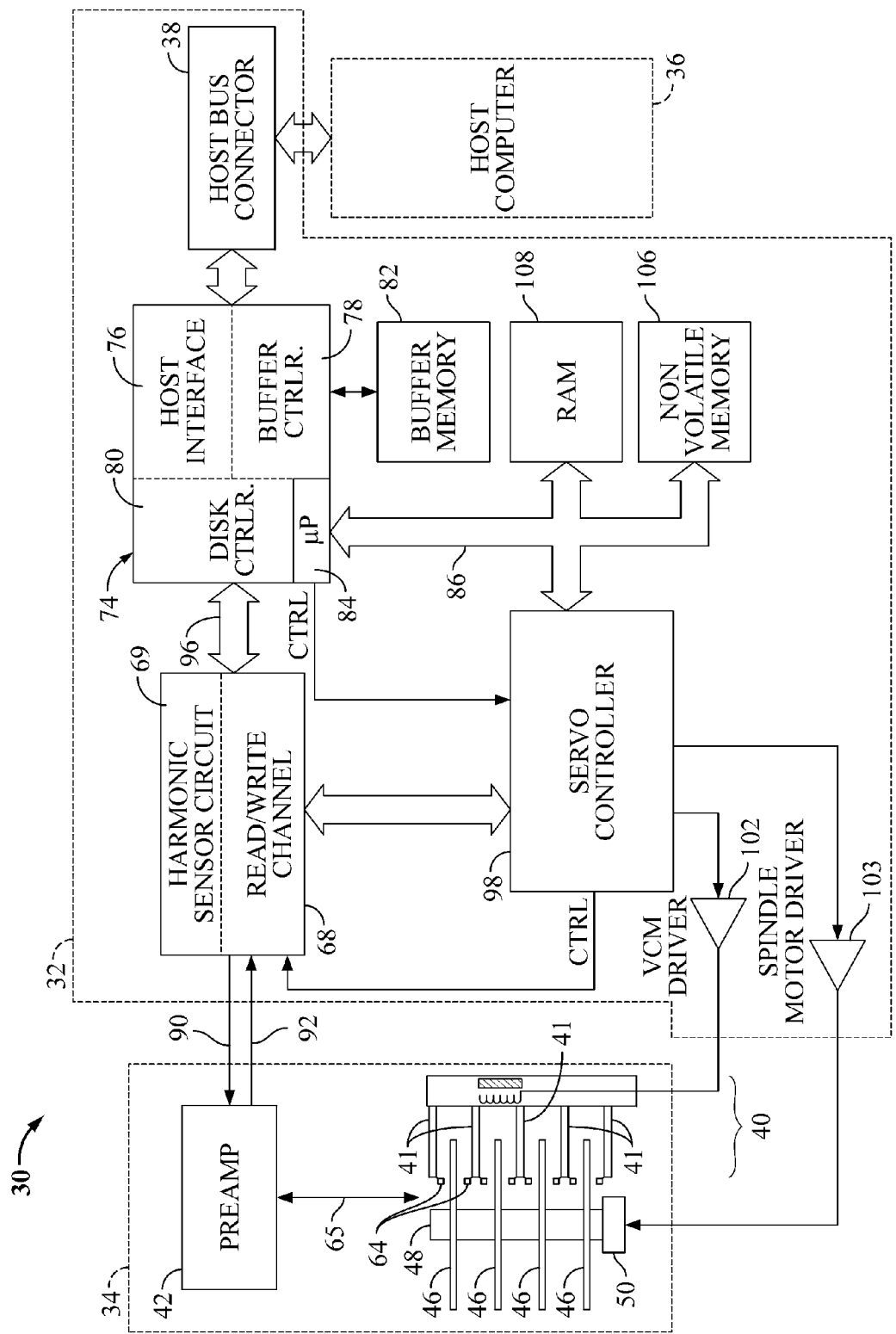
FIG. 1 shows a simplified block diagram of an exemplary disk drive, according to one embodiment of the invention.

FIG. 1 shows a simplified block diagram of an exemplary disk drive 30 according to one embodiment of the invention. Disk drive 30 may comprise a head/disk assembly (HDA) 34 and a controller printed circuit board assembly (PCBA) 32. Host computer 36 may be a computing device 36 such as a desktop computer, a laptop computer, a mobile computing device (e.g. PDA, camera, cell-phone, etc.), or any type of computing device. In one embodiment, Host computer 36 may be a test computer that is utilized to implement operations related to determining head non-linearity, as will be described. Disk drive 30 may be of a suitable form factor and capacity for larger computers or for smaller mobile devices (e.g. a small form factor (SFF) disk drive).

HDA 34 may include: one or more disks 46 for data storage; a spindle motor 50 for rapidly spinning each disk 46 (four shown) on a spindle 48; and an actuator assembly 40 for moving a plurality of heads 64 in unison over each disk 46. Actuator assembly 40 includes a plurality of actuator arms 41 having heads 64 attached to distal ends thereof, respectively, such that the actuator arms 41 and heads 64 are rotated about a pivot point so that the heads sweep radially across the disks 46, respectively.

In one embodiment, heads 64 utilized in disk drive 30 may be dynamic fly height (DFH) heads. DFH heads typically include a heater element that is integrated into the head transducer at one or more locations such that by applying power in the form of current to the heater element of the DFH head, the DFH head expands perpendicularly toward the disk surface thereby adjusting the fly height of the head. Typically, DFH heads are perpendicular media recording (PMR) heads but may also be longitudinal media recording (LMR) heads. DFH heads are well known in the art. In operation, responsive to a DFH control signal (i.e., current being applied to the heating element of the head transducer), the fly height of the DFH head may be controlled.

Figure 2:
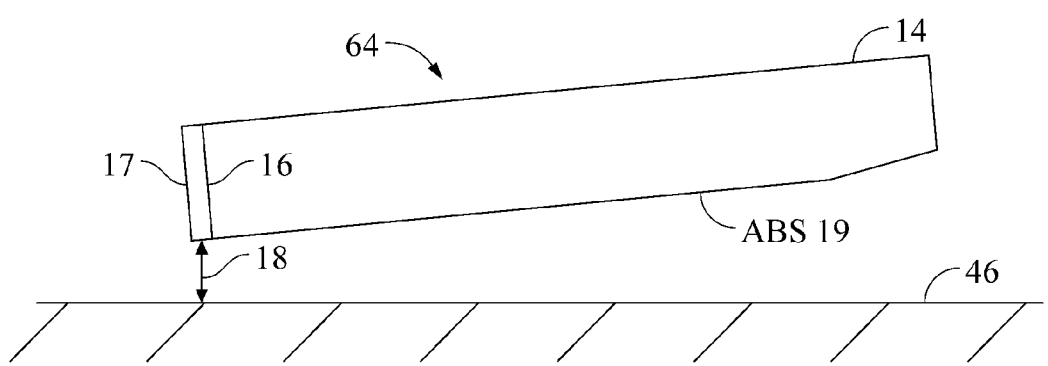
FIG. 2 is an exemplary diagram of dynamic fly height (DFH) head, according to one embodiment of the invention.

With brief reference to FIG. 2, in one embodiment, DFH head 64 may include a slider 14 and a thin-film magnetic transducer 17 disposed on a trailing surface 16 of the slider body for the reading/writing of data from/to recording tracks located on magnetic disk 46. Slider 14 is typically bonded to the end of an actuator arm 41. When disk 46 rotates, a thin air bearing is created between the surface of the magnetic disk 46 and an air-bearing surface (ABS) 19 of slider 14, which tends to separate the transducer 17 from the surface of disk 46 by a tiny spacing 18 known as the fly height.

Preamplifier 42 is connected to channel circuitry of read/write channel 68 in controller PCBA 32 via read data line 92 and write data line 90. DFH heads 64 are connected to a preamplifier 42 via a cable assembly 65 for reading and writing data on disks 46. Preamplifier 42 may amplify read and write signals from read/write channel 68 for transmission to DFH heads 64.

Controller PCBA 32 comprises read/write channel 68, servo controller 98, host interface and disk controller (HIDC) 74, voice coil motor driver (VCM) 102, spindle motor driver (SMD) 103, microprocessor 84, and several memory arrays—buffer or cache memory 82, RAM 108, and non-volatile memory 106.

Host initiated operations for reading and writing data in disk drive 30 may be executed under control of microprocessor 84 connected to the controllers and memory arrays via a bus 86. Program code executed by microprocessor 84 may be stored in non-volatile memory 106 and random access memory RAM 108. Program overlay code stored on reserved tracks of disks 46 may also be loaded into RAM 108 as required for execution.

During disk read and write operations, data transferred by preamplifier 42 may be encoded and decoded by read/write channel 68. During read operations, channel 68 may decode data into digital bits transferred on an NRZ bus 96 to HIDC 74. During write operations, HIDC may provide digital data over the NRZ bus to channel 68 which encodes the data prior to its transmittal to preamplifier 42. As one example, channel 68 may employ PRML (partial response maximum likelihood) coding techniques, although other coding processes may also be utilized. Additionally, read/write channel 68 may include a harmonic sensor circuit 69. Harmonic sensor circuit 69 may be utilized to generate data frequencies from patterns read by DFH heads 64, as will be described.

HIDC 74 may comprise a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

Servo controller 98 provides an interface between microprocessor 84 and actuator assembly 40 and spindle motor 50. Microprocessor 84 commands logic in servo controller 98 to position actuator assembly 40 using a VCM driver 102 and to precisely control the rotation of spindle motor 50 with a spindle motor driver 103. For example, disk drive 30 may employ a sampled servo system in which equally spaced servo sectors are recorded on each track of each disk 46. Data sectors are recorded in the intervals between servo sectors on each track. Servo sectors are sampled at regular intervals by servo controller 98 to provide servo position information to microprocessor 84. Servo sectors are received by channel 68, and are processed by servo controller 98 to provide position information to microprocessor 84 via bus 86.

Further, once DFH head 64 is generally over a desired track 12, servo controller 98 uses the servo bursts of a servo sector to keep DFH head 64 over the track in a "track follow" mode. During track following mode, DFH head 64 repeatedly reads a sector ID 26 of each successive servo sector to obtain the binary encoded sector ID number that identifies each sector of the track. Based on the TKID and sector ID, servo controller 98 continuously knows where DFH head 64 is relative to disk 46 and communicates this to microprocessor 84. In this way, the microprocessor 84 continuously knows where the DFH head 64 is relative to the disk and can command the movement of the DFH head 64, via the servo control system, to implement disk drive operations, suck as seeking, tracking, read/write operations, etc.

In one embodiment, disk drive 30 may be utilized to determine if any of its DFH heads 64 include non-linear characteristics. In particular, microprocessor 84 (hereinafter termed processor) of disk drive 30 may operate under the control of a program or routine to execute methods and processes in accordance with embodiments of the invention related to characterizing head non-linearity. Alternatively, host test computer 36 having a processor, memory, etc., may perform this processing instead of disk drive 30 to determine whether DFH heads 64 of disk drive 30 include non-linear characteristics by implementing the operations to be hereinafter described utilizing its own processing capabilities. Therefore, it should be appreciated that either disk drive 30 or host test computer 36 may implement these operations.

Typically, to generate an HMS curve, power is applied to the heating element of a DFH head across a pre-defined power range and data is read at a single fixed frequency to determine HMS (i.e., fly height) across the power range utilizing the Wallace spacing equation. However, a DFH head's non-linearity may severely degrade the accuracy of HMS actuation curve in describing a DFH head. This effect can cause a significant error when HMS data is used to determine the fly height of a DFH head.

One embodiment of the invention relates to determining the extent of non-linearity of a DFH head so as to prevent the use of inaccurate HMS data for setting a consequently inaccurate fly height for the DFH head. This prevents an inaccurate fly height setting that may cause a head/disk interaction and resulting damage to the head or disk.

As will be described, by analyzing HMS data (e.g., in terms of HMS actuation curves) for a DFH head at different data frequencies derived from the read-back of different density patterns or different harmonics of a single density pattern, a statistical method is provided that identifies the DFH as being linear or non-linear. If the head is linear across different data frequencies, the HMS actuation data is deemed reliable. If the head is non-linear across different data frequencies, the HMS actuation data may be deemed unreliable and the fly height may be set to a default value.

In one embodiment, processor 84 of disk drive 30 controls operations to determine if a DFH head 64 is non-linear. In particular, processor 84 operating under the control of a program or routine, estimates sets of head media spacing (HMS) actuation data for a DFH head 64 at multiple frequencies by commanding the application of power to the DFH head 64 across a pre-defined power range at each of the multiple frequencies. Sets of HMS actuation data may be represented as HMS curves for ease of description.

For a pair of data frequencies (e.g., a first and a second data frequency) processor 84 determines a pair of HMS values (e.g., a first and second HMS value) based upon correspondingly generated first and second sets of HMS actuation data (e.g., HMS actuation curves). Next, processor 84 calculates a difference value between the first and second HMS values. Processor 84 determines whether the difference value exceeds a threshold, and, if so, processor 84 may determine that the HMS actuation data for the DFH head is unreliable. If the HMS actuation data is unreliable, processor 84 determines that the head includes non-linear characteristics and sets a default fly height value for the DFH head.

Alternatively, if the difference value is less than the threshold, then processor 84 determines that the HMS actuation data is reliable and that the head is linear. In one embodiment, the difference value may be a means square difference value. Processor 84 may estimate the HMS actuation data based upon the Wallace spacing loss equation. The sets of HMS actuation data may be described as HMS actuation curves.

It should be appreciated that embodiments of the invention may be implemented with processor 84 and/or other circuitry of disk drive 30 or by the processing capabilities of host test computer 36. Particularly, circuitry of the disk drive or test computer, including but not limited to processor 84, may operate under the control of a program or routine to execute methods or processes in accordance with one embodiment of the invention related to determining head non-linearity based upon HMS actuation data, as previously described. For example, such a program or routine may be implemented in hardware, firmware, or software. In one embodiment, such a program may be implemented in firmware or software (e.g., stored in non-volatile memory 106 or other locations) and may be implemented by processors such as processor 84 and/or other circuitry of disk drive 30. Further, for the purposes of the present specification, the term "processor" refers to any machine, logic, or circuitry that is capable of executing logic, commands, instructions, software, firmware, functionality, etc., and shall be taken to include, but not limited to, microprocessors, circuitry, controllers, application specific integrated circuits (ASICs), signal processors, etc.

Figure 3:
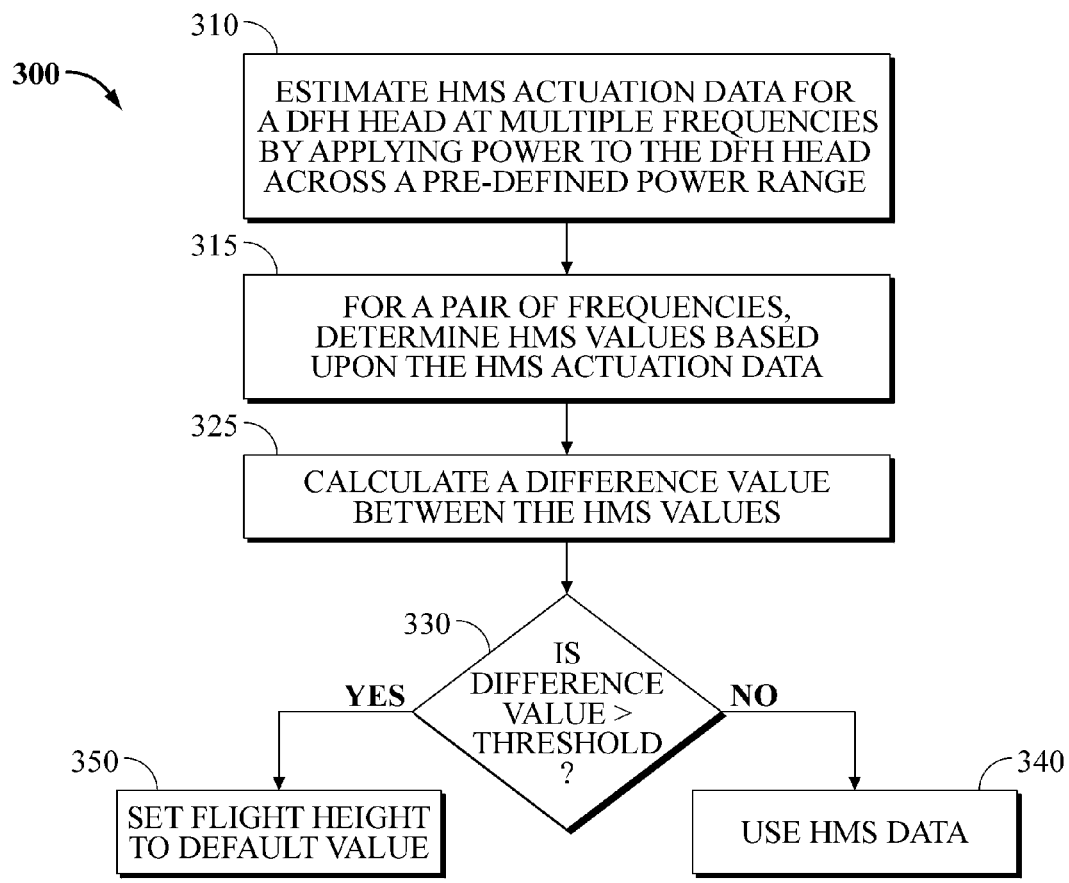
FIG. 3 is a flow diagram illustrating a process to determine whether a DFH head has non-linear characteristics based upon HMS actuation data, according to one embodiment of the invention.

FIG. 3 is a flow diagram illustrating a process 300 that may be utilized to determine whether a DFH head has non-linear characteristics based upon HMS actuation data, according to one embodiment of the invention. In one embodiment, process 300 may be implemented by processor 84 of disk drive 30.

Figure 4A:
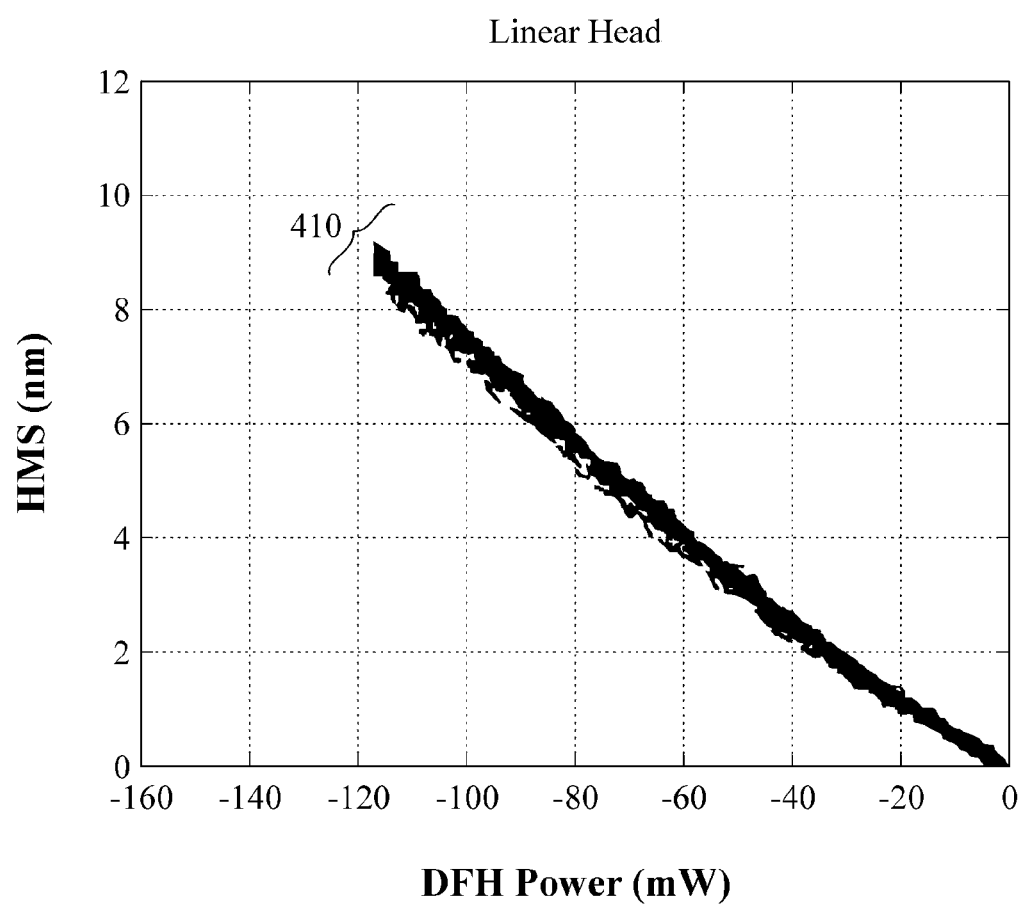
FIG. 4A is a graph illustrating a plurality of exemplary HMS actuation data sets represented by HMS actuation curves for a linear DFH head, according to one embodiment of the invention.

At block 310, HMS actuation data is estimated for a DFH head at multiple frequencies by applying power to the DFH head across a pre-defined power range. As shown in FIG. 4A, an example of a plurality of HMS actuation data sets represented by HMS actuation curves 410 are shown. Each HMS actuation curve 410 represents HMS values (i.e., fly height) in nanometers (nm) along the y-axis across a pre-defined power range in milli-Watts (mW) along the x-axis for multiple frequencies. Each HMS actuation curve is for a given frequency. In particular, each HMS actuation curve 410 represents HMS values versus power applied to the DFH head across a pre-defined power range of approximately −118 mW to 0 mW for a given frequency. As previously described, HMS values or fly height may be estimated based upon the Wallace spacing loss equation. As can be seen in FIG. 4A, all of the HMS curves 410 are linear across multiple different frequencies indicating that, in this instance, the particular DFH head is most likely linear.

Next, at block 315, for a selected pair of frequencies (e.g., a first and second frequency), process 300 determines HMS values based upon the HMS actuation data. In particular, looking at FIG. 4B, similar to FIG. 4A, a plurality of exemplary HMS curves 420 representing sets of HMS actuation data may be estimated. For example, HMS actuation curve 425 may represent HMS actuation data for the DFH head at a first data frequency across the pre-defined power range and HMS actuation curve 430 may represent HMS actuation data for the DFH head at a second data frequency across the pre-defined power range. In particular, for a first and second data frequency represented by HMS actuation curves 425 and 450, a first and a second HMS power value may be determined. It should be noted that HMS actuation curves are used as a general descriptive illustration to illustrate the HMS actuation data that is estimated by the processor.

As an example, for a desired fly height of 4 nm at a first data frequency, the first HMS power value required is approximately −110 mW as shown at point 440. On the other hand, for a desired fly height of 4 nanometers at a second data frequency the second HMS power value required is approximately −70 mW as shown at point 450. At block 325, process 300 calculates a difference between the HMS power values. In this example, this would be the difference value between the first and second HMS power values shown at points 440 and 450 in FIG. 4B.

At block 330, process 300 determines whether the difference value between the first and second HMS power values exceeds a threshold. If so, process 300 may set the fly height for the DFH head to a default value (block 350). This may occur because the DFH head has been determined to be non-linear and a default value may be set because the HMS actuation data is considered to be unreliable for the DFH head. The default value may be considered a safe fly height value to avoid head/disk interactions. Alternatively, if the difference value is less than the threshold value, then at block 340 the HMS actuation data is considered reliable and the HMS data is used for the DFH head (block 340) and the head is considered to have linear characteristics. Because the DFH head is considered to be linear, an optimized fly height value may be utilized.

Figure 4B:
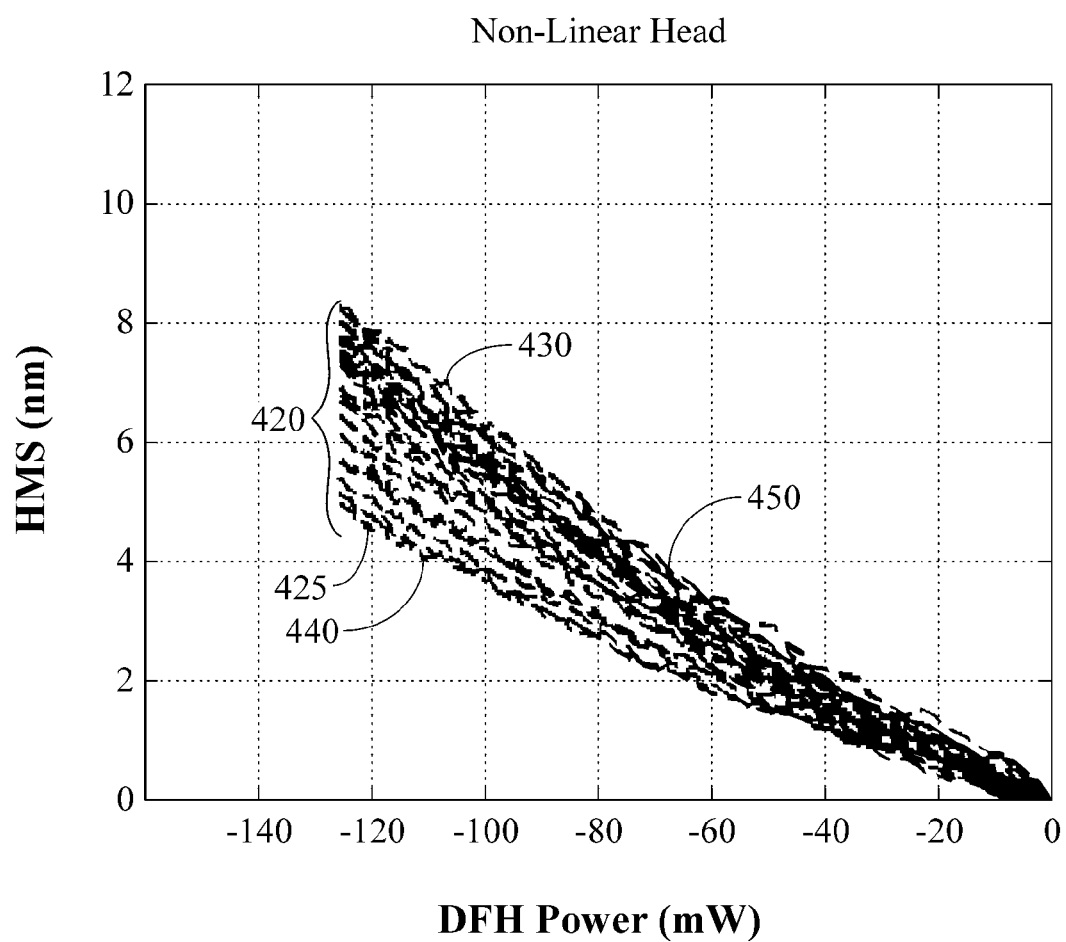
FIG. 4B is a graph illustrating a plurality of exemplary HMS actuation data sets represented by HMS actuation curves for a non-linear DFH head, according to one embodiment of the invention.

HMS actuation curves 410 of FIG. 4A illustrate that, in this instance, the exemplary HMS actuation data shows that the DFH head possesses linear characteristics and the DFH head is determined to be linear. Alternatively, exemplary HMS actuation curves 420 of FIG. 4B illustrate that the DFH head possesses non-linear characteristics due to the spread of the HMS curves for different frequencies.

From HMS actuation curves 420, a first and a second HMS power value may be estimated to achieve a target fly height for each frequency. As previously described, for a desired fly height of 4 nm at the first frequency shown by the first HMS actuation curve 425, the first HMS power value required is approximately −110 mW as shown at point 440 and for the same desired fly height of 4 nanometers at the second frequency for the second HMS actuation curve 430, the HMS power value required is approximately −70 mW as shown at point 450.

Based upon this, in one embodiment, a means square difference equation may be utilized to determine if the HMS data is reliable or unreliable and, therefore, whether the HMS data describes a linear or non-linear head. An example of this may be seen by the following equation:

$$R2 = 1 - \frac{[Power1 - Power2]}{Power1}$$

In particular, looking at the above mean square difference equation, it can be seen that if HMS power value 440 is −110 mW and the HMS power value 450 is −70 mW than the mean square difference equation yields: 1−(110−70)/110=0.64. This may be considered to be too large a variance such that the difference value is greater than a predetermined threshold value (e.g., 0.10) and the DFH head may therefore be considered to be non-linear.

Although a means square difference value equation is described, it should be appreciated that a wide variety of different difference value formulations and equations may be utilized. Additionally, although the first and second HMS values as previously described were for first and second HMS power values for desired fly heights, alternatively, first and second fly height values for desired power values may be utilized in the described means square difference value with the same effect. Additionally, although only a pair of first and second HMS values from a pair of first and second HMS actuation curves is illustrated for brevity's sake, it should be appreciated that based upon testing considerations, many more HMS values and HMS actuation curves may be utilized for non-linearity testing.

Moreover, according to one embodiment of the invention, HMS actuation data may be estimated from a single wavelength or multiple wavelengths of a read pattern that has been written to a disk. For example, harmonic analysis may be utilized to compute HMS actuation data using multiple harmonics from a signal generated from reading a fixed pattern. Alternatively, multiple patterns may be read that have different wavelengths.

Figure 5:
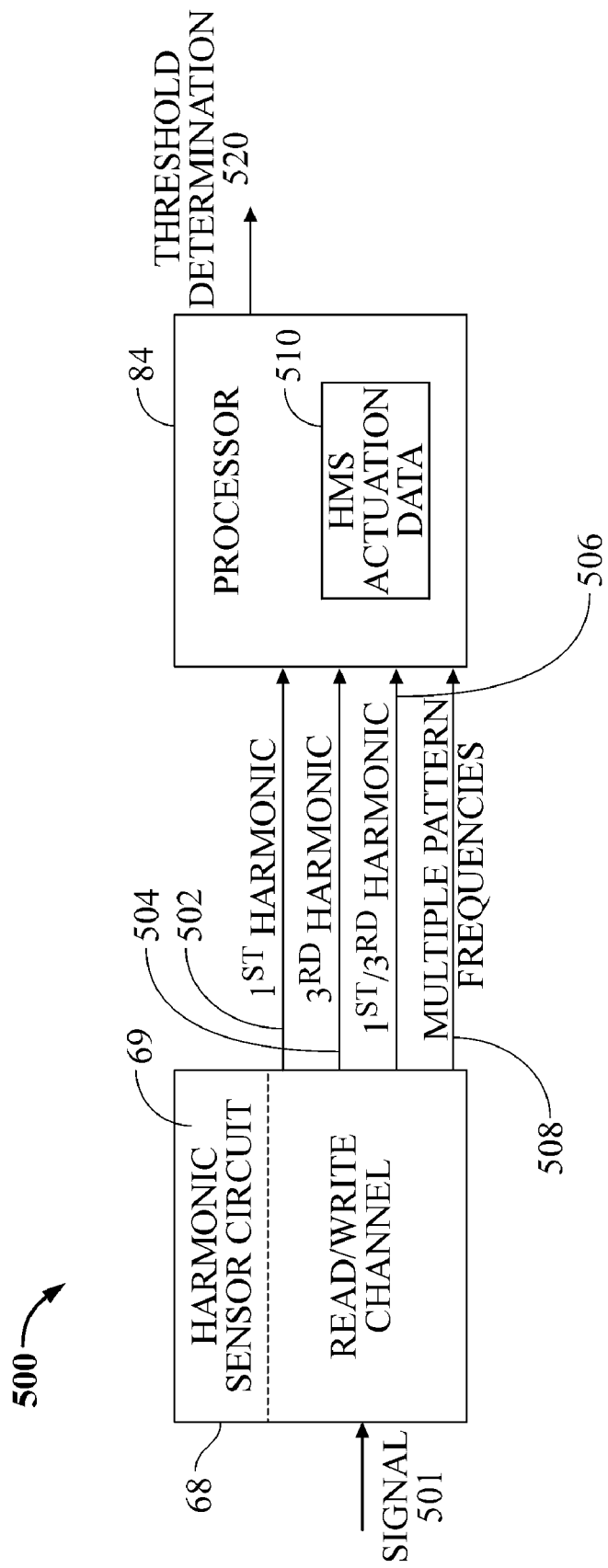
FIG. 5 is a block diagram illustrating a read/write channel that includes a harmonic sensor circuit, according to one embodiment of the invention.

To accomplish this, as shown in FIG. 5, read/write channel 68 may include a harmonic sensor circuit 69 that, based upon an input signal 501 from the DFH head reading a fixed pattern having a fixed pattern density written to disk 46 may generate a first harmonic signal 502, a third harmonic signal 504, and/or a combination of a first and third harmonic signal 506 in order to determine the frequencies for HMS curves (i.e., the first and second data frequencies).

Alternatively, based upon an input signal 501 from the DFH head reading at least a first and second pattern written to disk 46, read/write channel 68 may pass on multiple read data pattern frequencies 508 in order to determine the frequencies for HMS curves (i.e., the first and second data frequencies). For example, the first data frequency may be generated from a first pattern having a first pattern density and the second data frequency may be generated from a second pattern having a second pattern density that is different from the first pattern density.

Based upon the frequencies and/or harmonics of these signals, processor 84 may, as previously described, generate HMS actuation data 510, determine HMS values, and make a threshold determination 520, as previously described.

Figure 6:
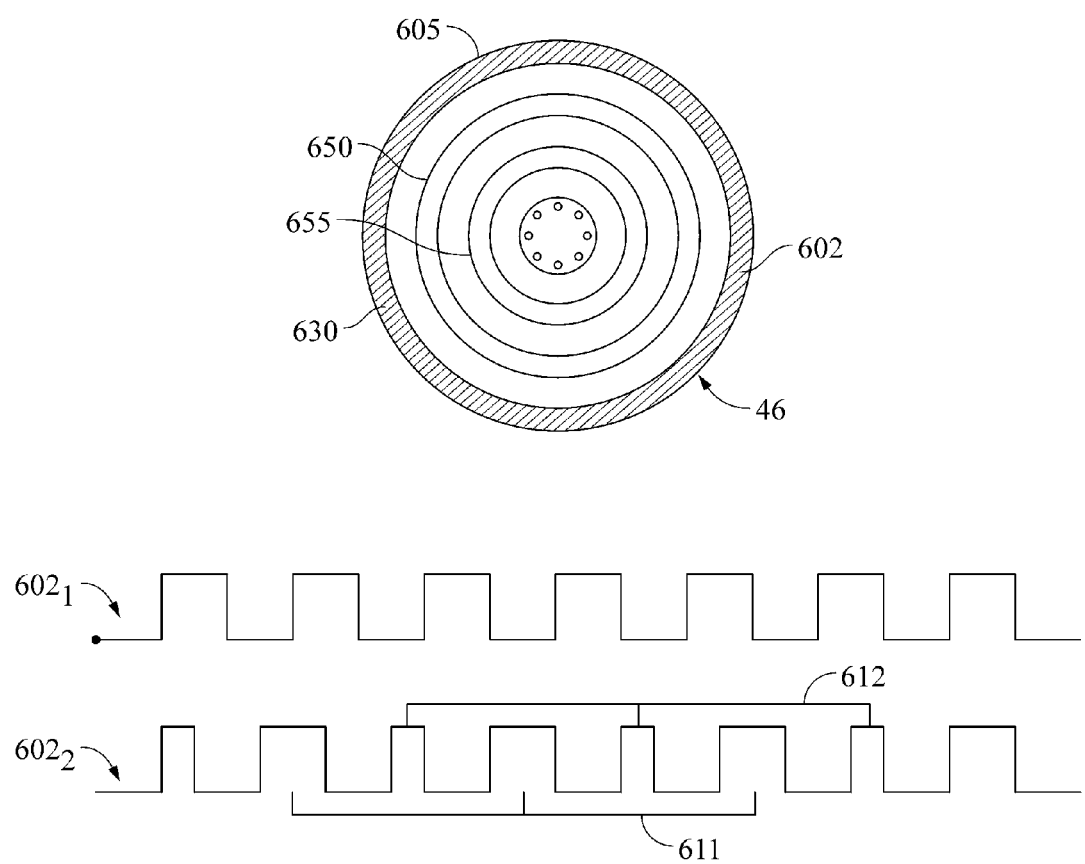
FIG. 6 is a diagram illustrating an example pattern that may be pre-written at an outer diameter (OD) of a disk for use in generating first and second data frequencies, according to one embodiment of the invention.

For example, turning to FIG. 6, FIG. 6 is a diagram illustrating a pattern 602 written at the outer diameter (OD) 605 of disk 46. Alternatively, pattern 602 may be written near the inner diameter (ID) 655 of disk 46, or at another location, such as near the middle diameter (MD) 650 of disk 46.

In one embodiment, processor 84 may estimate HMS actuation data based upon the DFH head reading fixed single pattern 602$_1$ having a fixed pattern density. In this embodiment, the first and second data frequencies may be based upon the harmonics of this read fixed single pattern 602$_1$. For example, harmonic sensor circuit 69 of read/write channel 68 may generate a first harmonic signal, a third harmonic signal, or a combination of a first and a third harmonic signal from the pattern density of fixed single pattern 602$_1$ written to disk 46. It should be appreciated that many other harmonics or harmonic combinations may be utilized dependent upon testing requirements. Read/write channel 68 may transmit these data frequencies to processor 84 for HMS actuation data generation, HMS value determination, and threshold determination to determine the linearity or nonlinearity of the DFH head, as previously described.

In one embodiment, processor 84 may estimate the HMS actuation data based upon the DFH head reading a pattern 602$_2$ written to disk 16 that include multiple patterns including, for example, at least a first pattern 611 having a first pattern density and a second pattern 612 having a second pattern density that is different from the first pattern density. Read/write channel 68 may transmit the first and second data frequencies generated by the reading of these first and second patterns 611 and 612 to processor 84 for HMS actuation data generation, HMS value determination, and threshold determination to determine the linearity or nonlinearity of the DFH head, as previously described.

This methodology may be performed by the processor of the disk drive itself or by the processor of a host test computer that tests the disk drive. It should be noted that energy content at each harmonic may be affected differently by the non-linearity of the DFH head. Therefore, testing may be performed for one or more of the previously described harmonic combinations or directly read single or multiple patterns to gain a more accurate description of head non-linearity.

Further, as previously described, if based upon the HMS data, a DFH head exhibits non-linear characteristics, a default fly height value may be assigned to the DFH head to avoid head-disk interactions. It should be appreciated that these techniques may be applied to each of the DFH heads of a disk drive. Thus, some heads in a disk drive may be determined to be linear and will utilize optimal fly heights based on HMS curves and other heads will be determined to be non-linear and will utilize safety default values.

These techniques may also be applied to collect statistical HMS data for a class of DFH heads and may be used to determine a more optimal fly height for the class of DFH heads. For example, if HMS data is validated for a class of DFH heads, and they are found to be generally linear, a more aggressive fly height may be utilized to improve drive performance when utilizing the class of DFH heads. Generally, improving the control of the fly height setting generally leads to improved operating margins and improves read/write performance.

It should be appreciated that components of the various embodiments of the invention may be implemented as hardware, software, firmware, microcode, or any combination thereof. When implemented in software, firmware, or microcode, the elements of the embodiment of the present invention are the program code or code segments that include instructions to perform the necessary tasks. A code segment may represent a procedure, a function, a subprogram, a program, a routine, a subroutine, a module, a software package, a class, or any combination of instructions, data structures, or program statements. The program or code segments may be stored in a processor readable medium. Further, the "processor readable or accessible medium" may include any medium that can store, transmit, or transfer information. Examples of accessible medium include an electronic circuit, a semiconductor memory device, a read only memory (ROM), a flash memory, an erasable ROM (EROM), a floppy diskette, a compact disk (CD-ROM), an optical disk, a hard disk, a fiber optic medium, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

The methods and processes previously described can be employed for disk drives that utilize perpendicular media recording (PMR) DFH heads. However, numerous alternatives for other types of disk drives with similar or other characteristics, such as disk drives that utilize longitudinal media recording (LMR) DFH heads, can be employed by those skilled in the art to use the invention with equal advantage to implement these techniques. Further, although embodiments have been described in the context of a disk drive with DFH heads, the invention can be employed in many different types of disk drives having a head that scans the media.

What is claimed is:

1. A method to determine head non-linearity in response to a dynamic fly height (DFH) control signal for a disk drive, the method comprising:
estimating a first and second set of head media spacing (HMS) actuation data for the head for a first and second data frequency by applying power to the head across a pre-defined power range;
determining a first and second HMS value based upon the first and second sets of HMS actuation data;
calculating a difference value between the first and second HMS values; and
determining that the difference value exceeds a threshold.

2. The method of claim 1, further comprising setting a fly height value for the head to a default value.

3. The method of claim 1, wherein the difference value is a means square difference value.

4. The method of claim 1, wherein the first and second HMS values are a first and second power value for a given fly height.

5. The method of claim 1, wherein the first and second HMS values are a first and second fly height for a given power value.

6. The method of claim 1, wherein the HMS actuation data is estimated based upon a Wallace spacing loss equation.

7. The method of claim 1, wherein the HMS actuation data is estimated based upon the head reading a fixed pattern from a disk having a fixed pattern density.

8. The method of claim 7, wherein the first and second data frequencies are based upon harmonics of the fixed pattern.

9. The method of claim 7, wherein the first and second data frequencies correspond to at least one of a first and a third harmonic of the fixed pattern.

10. The method of claim 1, wherein the HMS actuation data is estimated based upon the head reading a first pattern having a first pattern density and a second pattern having a second pattern density that is different from the first pattern density.

11. The method of claim 10, wherein the first and second frequencies are based upon the first and second pattern densities.

12. A disk drive to determine head non-linearity comprising:
a disk;
a dynamic fly height (DFH) head to write and read data to and from the disk, wherein a fly height of the DFH head is controlled responsive to a DFH control signal;
a processor for controlling operations to determine DFH head non-linearity, the processor under the control of a program to:
estimate a first and second set of head media spacing (HMS) actuation data for the head for a first and second data frequency by applying power to the DFH head across a pre-defined power range;
determine a first and second HMS value based upon the first and second sets of HMS actuation data;
calculate a difference value between the first and second HMS values; and
determine that the difference value exceeds a threshold.

13. The disk drive of claim 12, wherein the processor further sets a fly height value for the DFH head to a default value.

14. The disk drive of claim 12, wherein the difference value is a means square difference value.

15. The disk drive of claim 12, wherein the first and second HMS values are a first and second power value for a given fly height.

16. The disk drive of claim 12, wherein the first and second HMS values are a first and second fly height for a given power value.

17. The disk drive of claim 12, wherein the processor estimates the HMS actuation data based upon a Wallace spacing loss equation.

18. The disk drive of claim 12, wherein the processor estimates the HMS actuation data based upon the DFH head reading a fixed pattern from the disk having a fixed pattern density.

19. The disk drive of claim 18, wherein the first and second data frequencies are based upon harmonics of the fixed pattern.

20. The disk drive of claim 18, wherein the first and second data frequencies correspond to at least one of a first and a third harmonic of the fixed pattern.

21. The disk drive of claim 12, wherein the processor estimates the HMS actuation data based upon the DFH head reading a first pattern having a first pattern density and a second pattern having a second pattern density that is different from the first pattern density and, wherein, the first and second frequencies are based upon the first and second pattern densities.

22. A disk drive to determine head non-linearity comprising:

means for controlling a fly height of a head responsive to a dynamic fly height (DFH) control signal;

means for estimating a first and second set of head media spacing (HMS) actuation data for the head for a first and second data frequency including means for applying power to the head across a pre-defined power range;

means for determining a first and second HMS value based upon the first and second sets of HMS actuation data;

means for calculating a difference value between the first and second HMS values; and means for determining that the difference value exceeds a threshold.

23. The disk drive of claim 22, further comprising means for setting a fly height value for the head to a default value.

24. The disk drive of claim 22, wherein the difference value is a means square difference value.

25. The disk drive of claim 22, wherein the means for estimating the HMS actuation data includes means for the head to read a fixed pattern from a disk having a fixed pattern density.

* * * * *